(12) United States Patent
Rodriguez et al.

(10) Patent No.: US 11,162,328 B2
(45) Date of Patent: Nov. 2, 2021

(54) OILFIELD CHEMICAL INJECTION SYSTEM AND METHOD OF USE

(71) Applicants: Manuel Rodriguez, Denver City, TX (US); Armando Rodriguez Hernandez, Montery (MX); John Clifford Sandlin, Denver City, TX (US)

(72) Inventors: Manuel Rodriguez, Denver City, TX (US); Armando Rodriguez Hernandez, Montery (MX); John Clifford Sandlin, Denver City, TX (US)

( * ) Notice: Subject to any disclaimer, the term of this patent is extended or adjusted under 35 U.S.C. 154(b) by 230 days.

(21) Appl. No.: 16/273,144

(22) Filed: Feb. 11, 2019

(65) Prior Publication Data

US 2019/0249521 A1   Aug. 15, 2019

Related U.S. Application Data

(60) Provisional application No. 62/628,783, filed on Feb. 9, 2018.

(51) Int. Cl.
| | | |
|---|---|---|
| *E21B 37/06* | (2006.01) | |
| *C09K 8/524* | (2006.01) | |
| *E21B 41/00* | (2006.01) | |
| *E21B 34/02* | (2006.01) | |

(52) U.S. Cl.
CPC .............. *E21B 37/06* (2013.01); *C09K 8/524* (2013.01); *E21B 41/00* (2013.01); *E21B 34/02* (2013.01)

(58) Field of Classification Search
CPC ....................................................... E21B 37/06
See application file for complete search history.

(56) References Cited

U.S. PATENT DOCUMENTS 4,064,936 A * 12/1977 McClure ............... E21B 33/068
166/90.1

\* cited by examiner

*Primary Examiner* — Robert E Fuller
*Assistant Examiner* — Lamia Quaim
(74) *Attorney, Agent, or Firm* — Shannon Warren

(57) ABSTRACT

An injection method of use for treating a production fluid from a wellhead. An injection system comprising a chemical tanks, a skid assembly, a bacteria monitor, and a control panel. An actuated three-way valve selectively opens and closes to allow a portion of the production fluid into the bacteria monitor. The injection system adapted to selectively open the actuated three-way valve to receive a portion of the production fluid from the wellhead, receiving a portion of the production fluid from the wellhead, monitoring a chemical composition of the production fluid, selectively adding a mixture of chemicals from one or more chemical storage tanks into the production fluid, injecting the resulting mixture back into the wellhead, and monitoring the production fluid and modifying mixtures from the one or more chemical storage tanks and/or closing the actuated three-way valve according to a desired mixture.

6 Claims, 13 Drawing Sheets

OILFIELD CHEMICAL INJECTION SYSTEM AND METHOD OF USE

CROSS-REFERENCE TO RELATED APPLICATIONS

This application claims benefit to U.S. Patent Application No. 62/628,783 filed on Feb. 9, 2018.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

Prior art known to the Applicant includes U.S. Pat. No. 4,375,833A, US20050166961A1, U.S. Pat. Nos. 5,103,914A, 4,633,954A, 4,064,936A.

One advantage of an injection system 100 can comprise reduction of use of trucks for water which will reduce drivers, insurance, uniforms, retirement and benefits for such drivers.

Said injection system 100 can be configured to apply chemical to oil wells (such as a wellhead 102) to combat the bacteria that are present in wells. Said injection system 100 can save water since water is recycled from production. This will conserve fresh water and can stop fresh water storage. Since fresh water is a limited resource in many oil production environments, this is a substantial achievement. Additional benefits include limited use of pulling units because application of chemicals can elongate the life of the pumps, sucker rods, tubbing, and casing. This is nontrivial the cost of string tubbing, sucker rods, and pulling units cost millions of dollars.

Another benefit of said injection system 100 elimination of truck reliance since chemicals can fight the bacteria that the wells produce since the skid will do the work of the "kill truck". Today, the kill truck is used when a well produces a lot of bacteria and also to pump some sort of chemical at a high pressure accompanied with water, then it is left circulating for several hours. As a result, the hot oil truck that is used to pump hot water or hot oil which in turn is used to dissolve the paraffin or any other bacteria that accumulates in the car flow or trunk lines.

Consequently, said injection system 100 can do the same as these two trucks, resulting in the savings of money, time and effort.

Additionally, one or more chemical storage tanks 406 (which can comprise a first chemical storage tank 406a, a second chemical storage tank 406b and a third chemical storage tank 406c) can be selectively engaged to provide chemical treatment; thereafter, chemicals are not returned to said one or more chemical storage tanks 406, but into a production flow line 604.

Said injection system 100 additionally provides for one or more chemical flow meters 402 and a one or more electric chemical flow meters 1304; such flow meters are configured to measure a volume of chemical additive, and a volume of production.

Likewise, a one or more electrical pumps 800 can be configured to selectively apply volumes from said one or more chemical storage tanks 406.

Finally, an actuated three-way valve 524 is configured to be explosion proof.

BRIEF SUMMARY OF THE INVENTION

An injection method of use for treating a production fluid from a wellhead. An injection system comprising a chemical tanks, a skid assembly, a bacteria monitor, and a control panel. An actuated three-way valve selectively opens and closes to allow a portion of said production fluid into said bacteria monitor. Said injection system adapted to selectively open said actuated three-way valve to receive a portion of said production fluid from said wellhead, receiving a portion of said production fluid from said wellhead, monitoring a chemical composition of said production fluid, selectively adding a mixture of chemicals from one or more chemical storage tanks into said production fluid, injecting the resulting mixture back into said wellhead, and monitoring said production fluid and modifying mixtures from said one or more chemical storage tanks and/or closing said actuated three-way valve according to a desired mixture.

BRIEF DESCRIPTION OF THE SEVERAL VIEWS OF THE DRAWING

535-0003

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
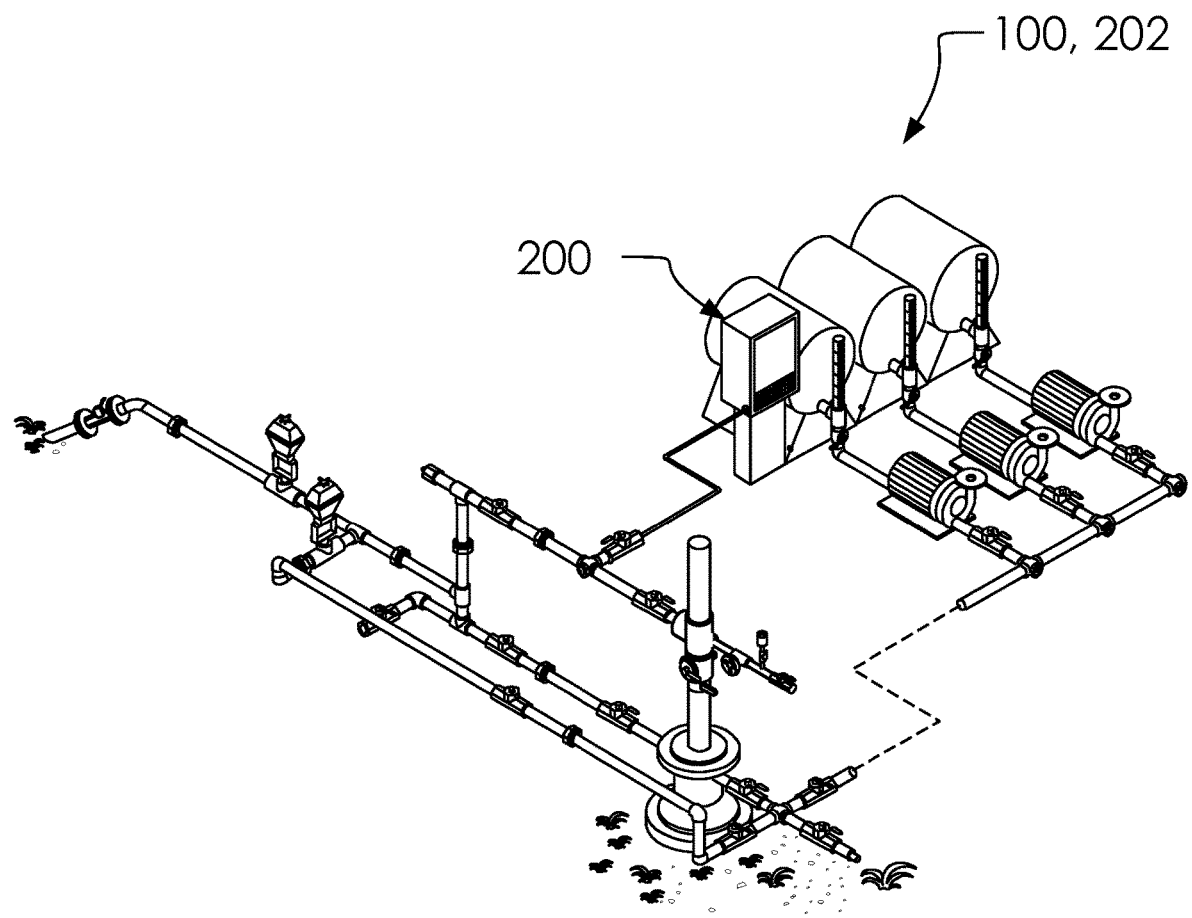
FIG. 1 illustrates a perspective overview of an injection system 100 installed on a wellhead 102.

FIG. 1 illustrates a perspective overview of an injection system 100 installed on a wellhead 102.

In one embodiment, said injection system 100 can comprise said wellhead 102, a chemical tanks 104, a skid assembly 106 and a control panel 108.

Said wellhead 102 can comprise a casing 110, a tubing 112 and a production fluid 114, as is known in the art.

One advantage of said injection system 100 can comprise reduction of use of trucks for water which will reduce drivers, insurance, uniforms, retirement and benefits for such drivers.

Said injection system 100 can be configured to apply chemical to oil wells (such as said wellhead 102) to combat the bacteria that are present in wells. Said injection system 100 can save water since water is recycled from production. This will conserve fresh water and can stop fresh water storage. Since fresh water is a limited resource in many oil production environments, this is a substantial achievement. Additional benefits include limited use of pulling units because application of chemicals can elongate the life of the pumps, sucker rods, tubing, and casing. This is nontrivial the cost of string tubbing, sucker rods, and pulling units cost millions of dollars.

Another benefit of said injection system 100 elimination of truck reliance since chemicals can fight the bacteria that the wells produce since the skid will do the work of the "kill truck". Today, the kill truck is used when a well produces a lot of bacteria and also to pump some sort of chemical at a high pressure accompanied with water, then it is left circulating for several hours. As a result, the hot oil truck that is used to pump hot water or hot oil which in turn is used to dissolve the paraffin or any other bacteria that accumulates in the car flow or trunk lines.

Consequently, said injection system 100 can do the same as these two trucks, resulting in the savings of money, time and effort.

Figure 2:
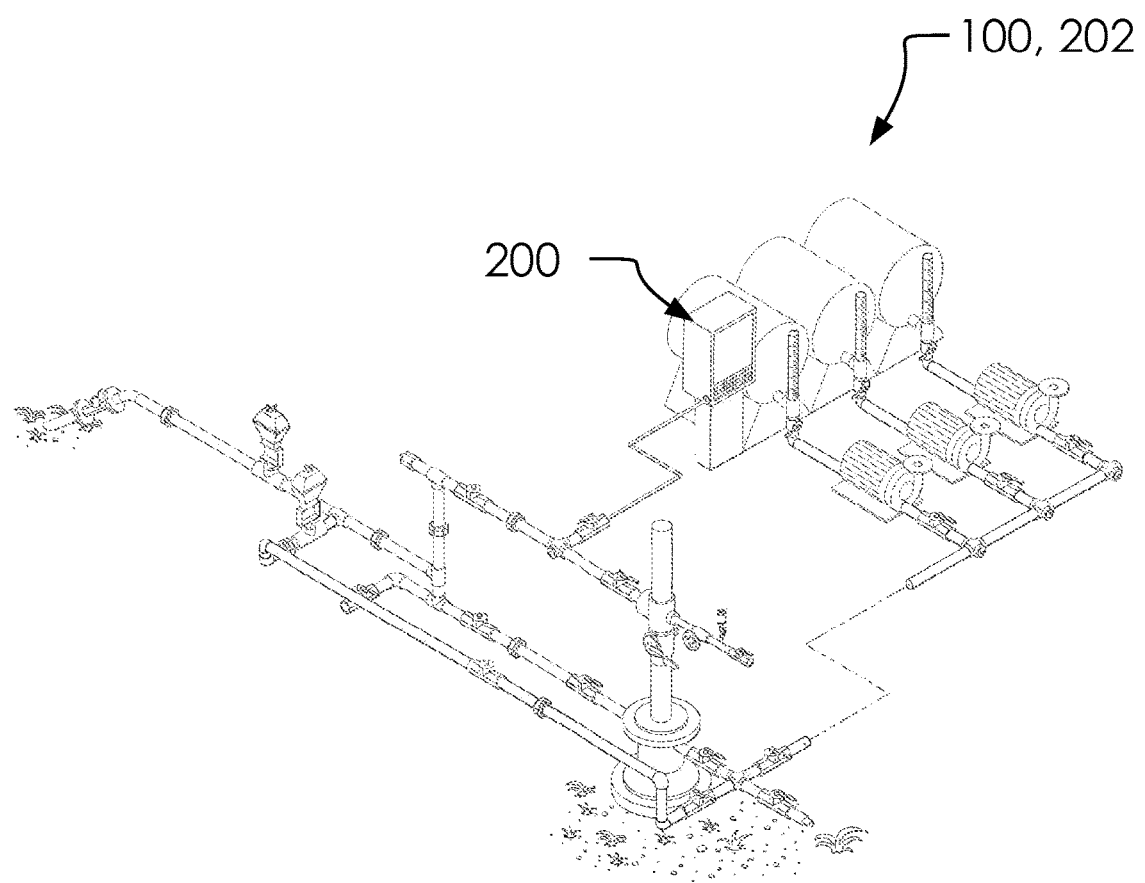
FIG. 2 illustrates said injection system 100 with a bacteria monitor 200 in an alternative injection system configuration 202.

FIG. 2 illustrates said injection system 100 with a bacteria monitor 200 in an alternative injection system configuration 202.

Said injection system 100 can comprise a system for treating and modifying said production fluid 114 from said wellhead 102. In one embodiment, said production fluid 114 can be monitored by said bacteria monitor 200, said skid assembly 106 can selectively provide additives from said chemical tanks 104 into said casing 110.

Figure 3:
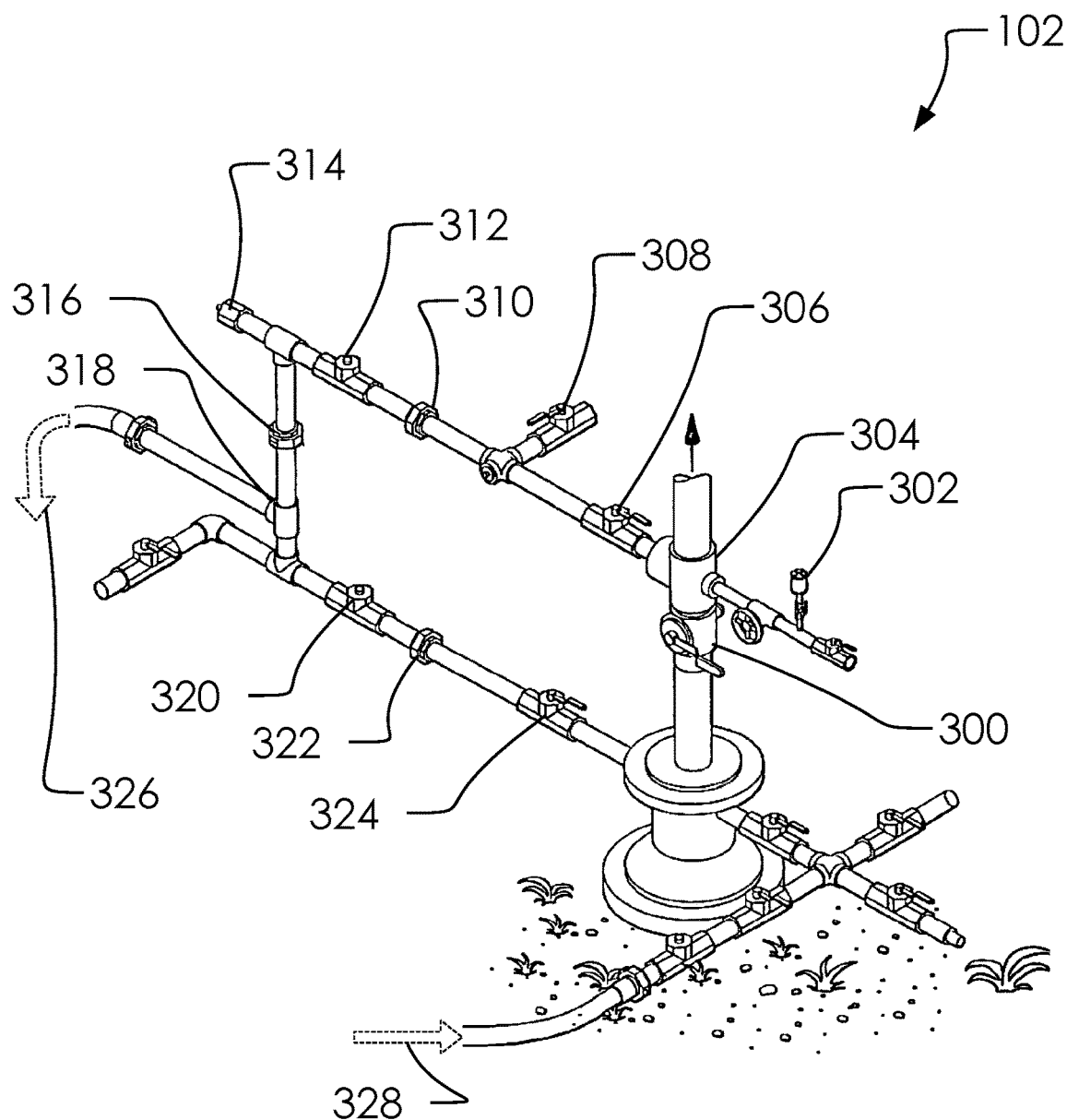
FIG. 3 illustrates a perspective overview of said wellhead 102.

FIG. 3 illustrates a perspective overview of said wellhead 102.

In one embodiment, said wellhead 102 can comprise a blow out preventer 300, a high pressure switch 302, a tee 304, a valve 306, a valve 308, an union 310, a check valve 312, a back pressure valve 314, an union 316, a tee 318, a check valve 320, an union 322 and a valve 324.

Accordingly, said injection system 100 can handle said production fluid 114 as produced by said wellhead 102, sending an unconditioned portion 326 of said production fluid 114 from said wellhead 102 to said skid assembly 106 and returning a conditioned portion 328 of said production fluid 114 into said wellhead 102.

Figure 4:
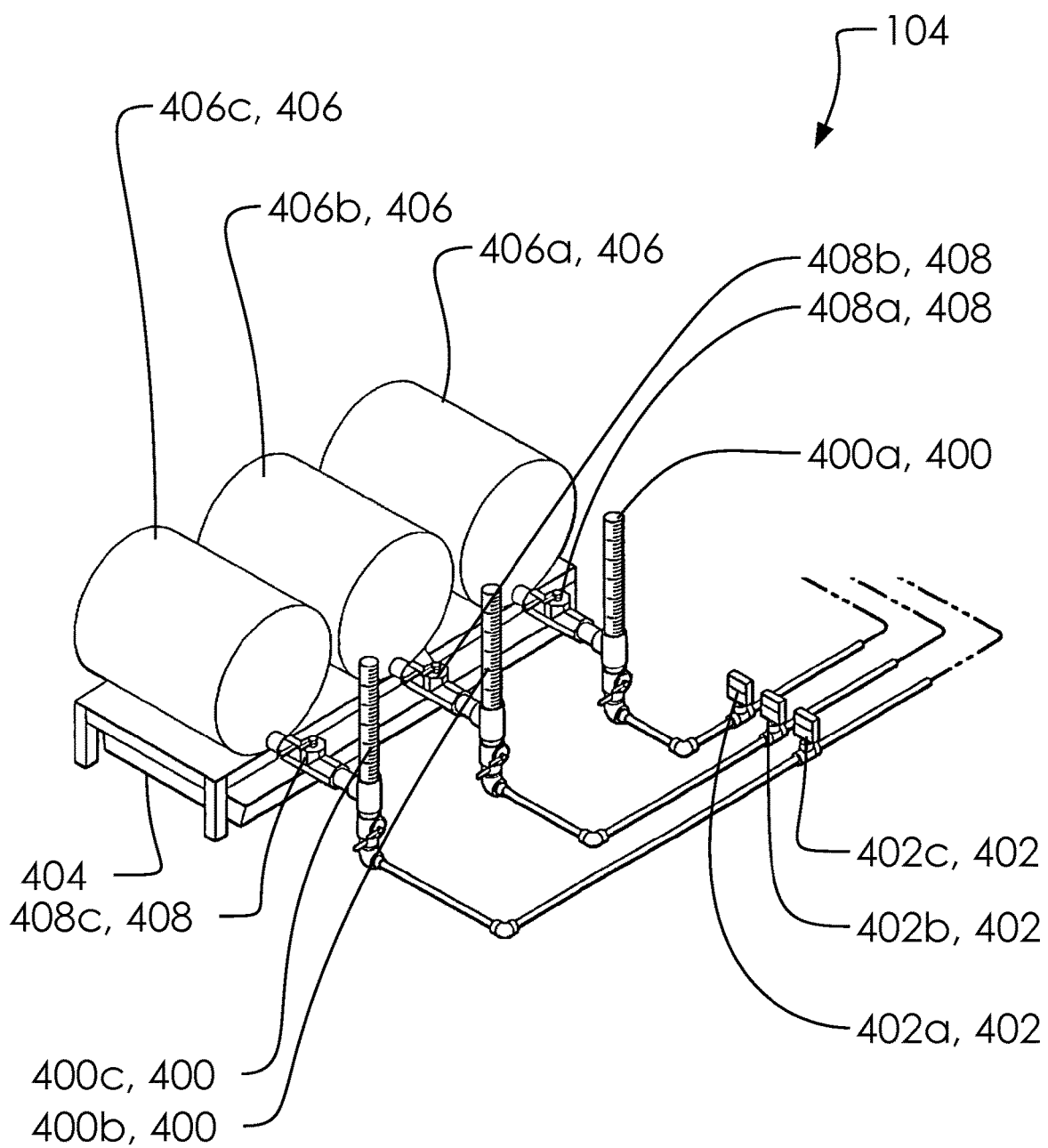
FIG. 4 illustrates a perspective overview of a chemical tanks 104.

FIG. 4 illustrates a perspective overview of said chemical tanks 104.

Said chemical tanks 104 can comprise one or more chemical gauges 400, one or more chemical flow meters 402, a poly tub container 404, one or more chemical storage tanks 406 and one or more block valves 408.

Said one or more chemical gauges 400 can comprise a first chemical gauge 400a, a second chemical gauge 400b and a third chemical gauge 400c. Said one or more chemical flow meters 402 can comprise a first chemical flow meter 402a, a second chemical flow meter 402b and a third chemical flow meter 402c. Said one or more chemical storage tanks 406 can comprise a first chemical storage tank 406a, a second chemical storage tank 406b and a third chemical storage tank 406c. Said one or more block valves 408 can comprise a first block valve 408a, a second block valve 408b and a third block valve 408c.

Said one or more chemical gauges 400 can comprise sight glass gauges which can comprise a 2" tee and 2" valve.

In one embodiment, said one or more block valves 408 can comprise 2" valves. Said one or more chemical flow meters 402 can comprise chemical injection meters.

Said injection system 100 can comprise a plurality of said one or more chemical storage tanks 406. The prior art is configured with one storage drum. Chemical returns to the tank when not being pumped into the well. This type of tank will not work in many locations (such as the West Texas Oilfield) because casing wells have too much pressure, and in such areas the original chemical drum may explode. In said injection system 100, said one or more chemical storage tanks 406 can be separated from said wellhead 102 to avoid this catastrophe.

Further, said injection system 100 can comprise three of said one or more chemical storage tanks 406. Said injection system 100 can comprise a treatment cycle comprising sending chemical from the well production to the flow line when its complete, instead of going back to the chemical bulk container, not only well casing but also internal flow line. As a result of this, said injection system 100 would not explode due to the pressure.

In one embodiment, said injection system 100 can comprise said one or more chemical flow meters 402. The prior art comprises no flow meters, which are needed to measure the amount of chemical and to know how much the well is pumping. Since the prior art has none, there is no way to know how much chemical is being injected and also to know how much the well is producing.

Figure 5A:
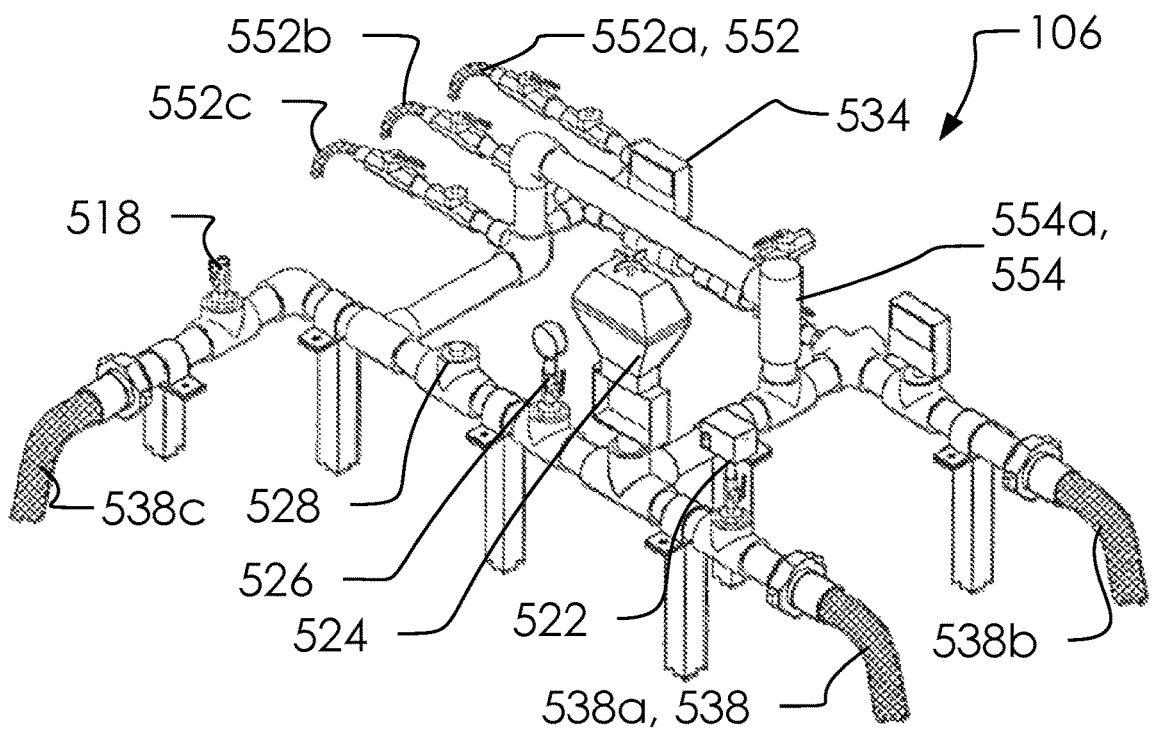
FIGS. 5A and 5B illustrate a perspective overview of a skid assembly 106 with and without original labels.
Figure 5B:
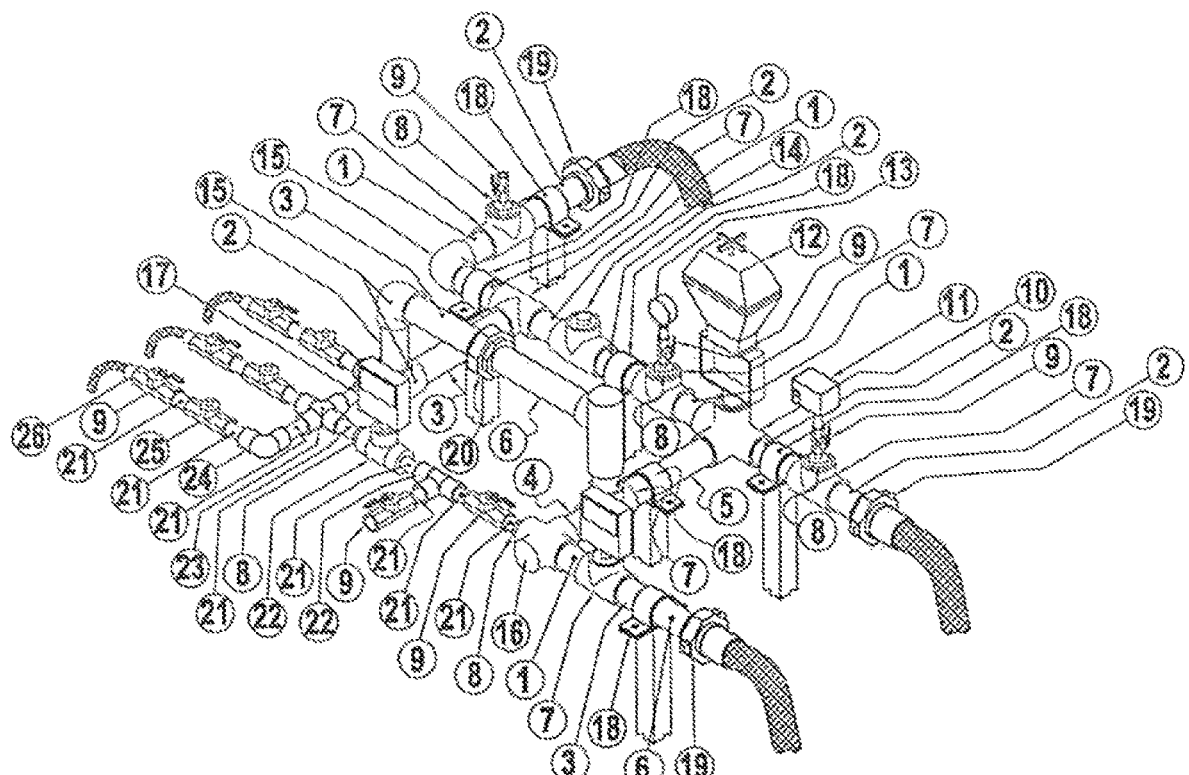

FIGS. 5A and 5B illustrate a perspective overview of said skid assembly 106 with and without original labels.

Numbers in circles are included in FIG. 5B which correspond to the following part numbers: 1 is a one or more nipples 502, 2 is a one or more nipples 504, 3 is a one or more nipples 506, 4 is a nipple 508, 5 is a nipple 510, 6 is a nipple 512, 7 is a screwed tee 514, 8 is a hex bushing 516, 9 is a ball valve 518, 10 is a three-way valve 520, 11 is a pressure switch 522, 12 is an actuated three-way valve 524, 13 is a pressure gauge 526, 14 is a check valve 528, 15 is a one or more elbows 530, 16 is a tee 532, 17 is a one or more pressure gauges 534, 18 is a one or more pipe clamps 536, 19 is a one or more pressure hoses 538, 20 is an union 540, 21 is a one or more nipples 542, 22 is a one or more tees 544, 23 is a cross 546, 24 is a one or more elbows 548, 25 is a one or more check valves 550, 26 is a one or more pressure hoses 552. Said one or more nipples 502 can comprise a first nipple 502a, a second nipple 502b, a third nipple 502c and a fourth nipple 502d. Said one or more nipples 504 can comprise a first nipple 504a, a second nipple 504b, a third nipple 504c, a fourth nipple 504d and a fifth nipple 504e. Said one or more nipples 506 can comprise a first nipple 506a, a second nipple 506b, a third nipple 506c and a fourth nipple 506d. Said one or more elbows 530 can comprise a first elbow 530a, a second elbow 530b and a third elbow 530c. Said one or more pressure gauges 534 can comprise a first pressure gauge 534a and a second pressure gauge 534b. Said one or more pipe clamps 536 can comprise a first pipe clamp 536a, a second pipe clamp 536b, a third pipe clamp 536c, a fourth pipe clamp 536d, a fifth pipe clamp 536e and a sixth pipe clamp 536f. Said one or more pressure hoses 538 can comprise a first pressure hose 538a, a second pressure hose 538b and a third pressure hose 538c. Said one or more nipples 542 can comprise a first nipple 542a, a second nipple 542b, a third nipple 542c, a fourth nipple 542d, a fifth nipple 542e, a sixth nipple 542f, a seventh nipple 542g, an eighth nipple 542h, a ninth nipple 542k, a tenth nipple 542m, an eleventh nipple 542n and a twelfth nipple 542p. Said one or more tees 544 can comprise a first tee 544a and a second tee 544b. Said one or more elbows 548 can comprise a first elbow 548a and a second elbow 548b. Said one or more check valves 550 can comprise a first check valve 550a, a second check valve 550b and a third check valve 550c. Said one or more pressure hoses 552 can comprise a first pressure hose 552a, a second pressure hose 552b and a third pressure hose 552c.

In one embodiment, said skid assembly 106 can comprise the valves, pumps, meters, and controls for said injection system 100.

In one embodiment, said actuated three-way valve 524 can be operated by explosion proof actuators for doing the work of turning it off and on. Said actuated three-way valve 524 can open to initiate the treatment cycle and close to complete the treatment cycle. In one embodiment, a bacteria level in said wellhead 102 can cause said actuated three-way valve 524 to open and close for said treatment cycle.

Figure 6:
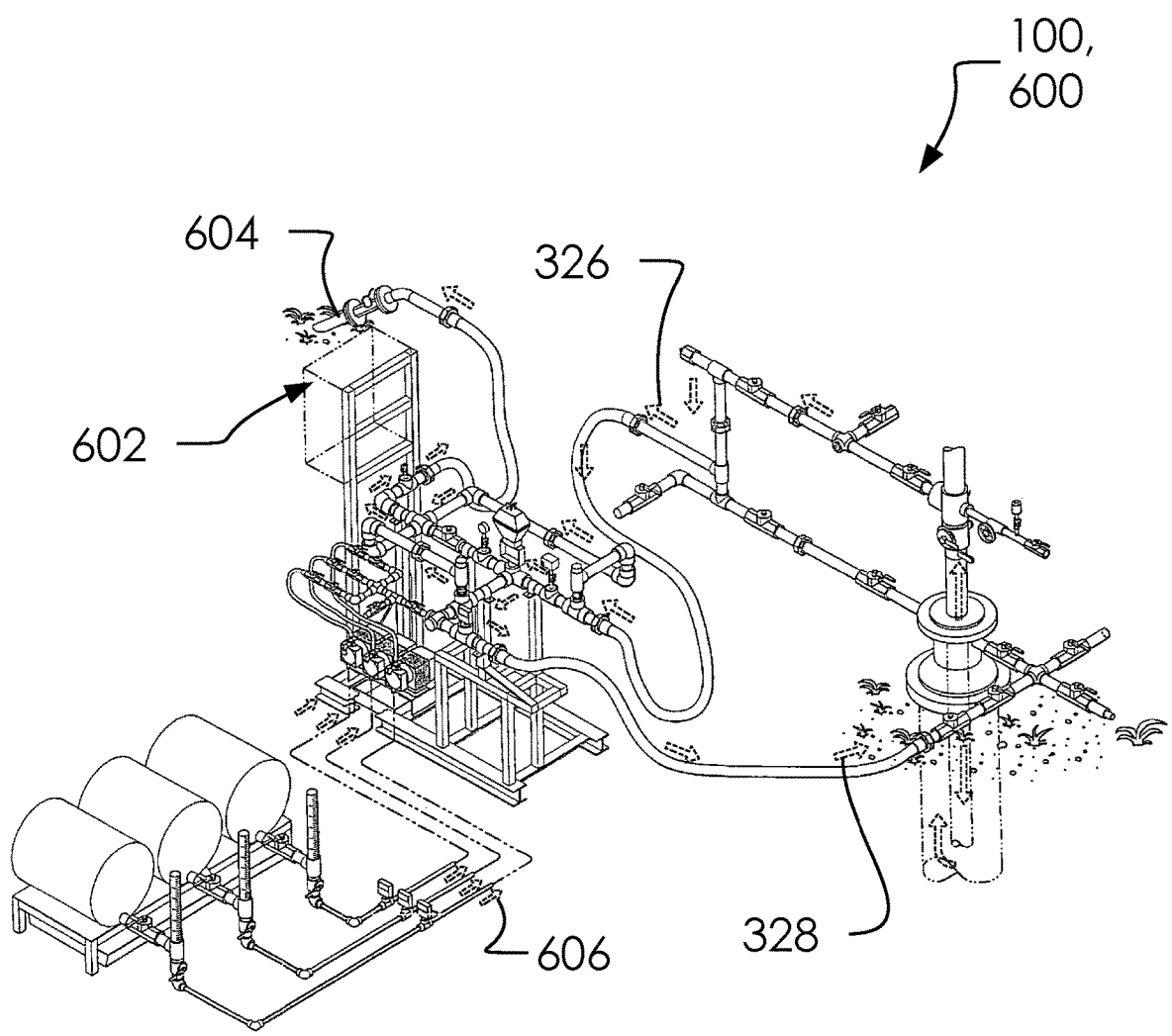
FIG. 6 illustrates a perspective overview of a fluid flow illustration 600 for said injection system 100.

FIG. 6 illustrates a perspective overview of a fluid flow illustration 600 for said injection system 100.

In one embodiment, said injection system 100 can provide for output into a production flow line 604 (as is known in the art) out of said third pressure hose 538c.

Figure 7A:
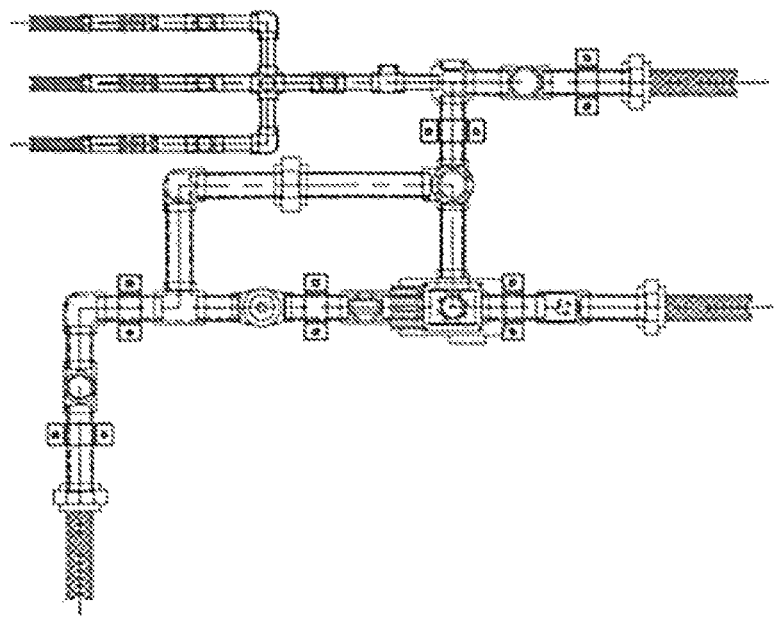
Figure 7B:
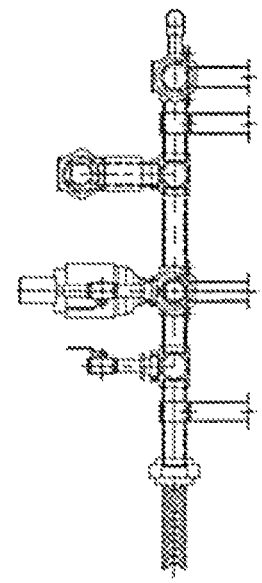
Figure 7C:
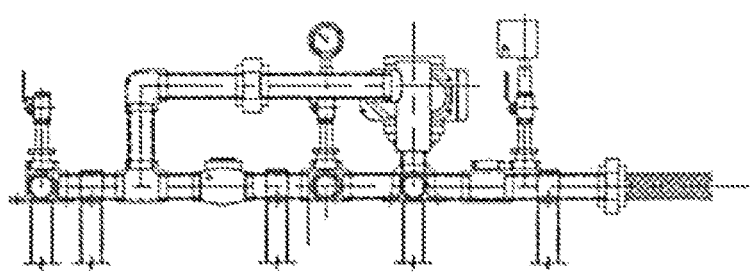

FIGS. 7A, 7B and 7C illustrate an elevated top, first side and second side view of said skid assembly 106.

Figure 8:
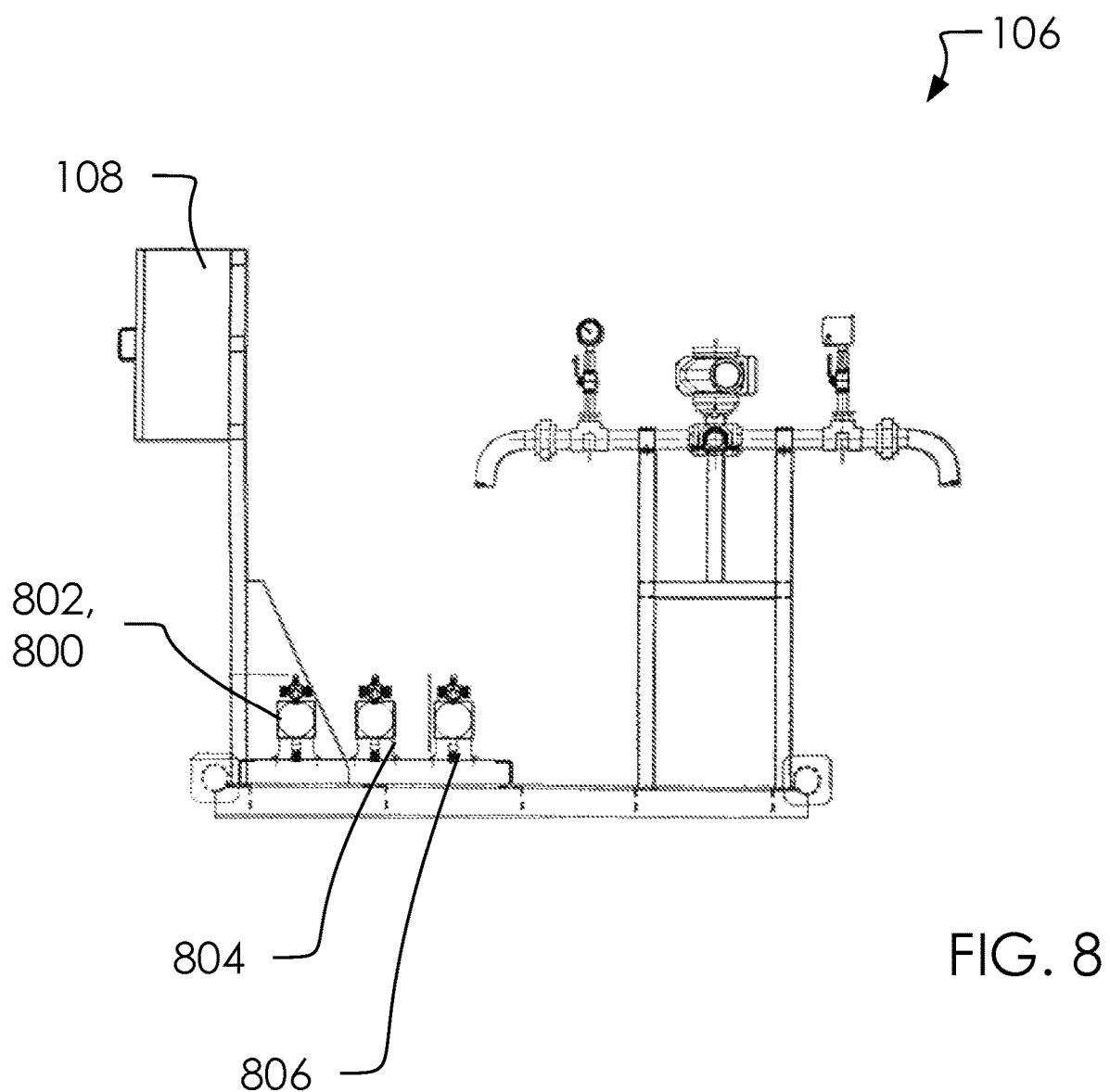
FIG. 8 illustrates an elevated side view of said skid assembly 106.

FIG. 8 illustrates an elevated side view of said skid assembly 106.

In one embodiment, said one or more pressure hoses 552 can be driven by a one or more electrical pumps 800. Said one or more electrical pumps 800 can comprise a first pump 802, a second pump 804 and a third pump 806. The prior art comprises only one pump which operates by pumping unit walking beam. Said injection system 100 comprises three pumps; wherein, one among said one or more electrical pumps 800 can be used for each chemical to be provided during the individually treatment cycles. Said one or more electrical pumps 800 can be driven by electrical power and not by the pumping unit walking beam. In one embodiment, three different types of chemicals are used because there can be different types of bacteria found in certain areas (such as West Texas).

The prior art uses an electrical actuator motor which is not explosion proof. Should it short circuit the actuator would explode. Said injection system 100, on the other hand, uses said actuated three-way valve 524 operated by explosion proof actuators that measure to prevent an explosion.

Figure 9A:
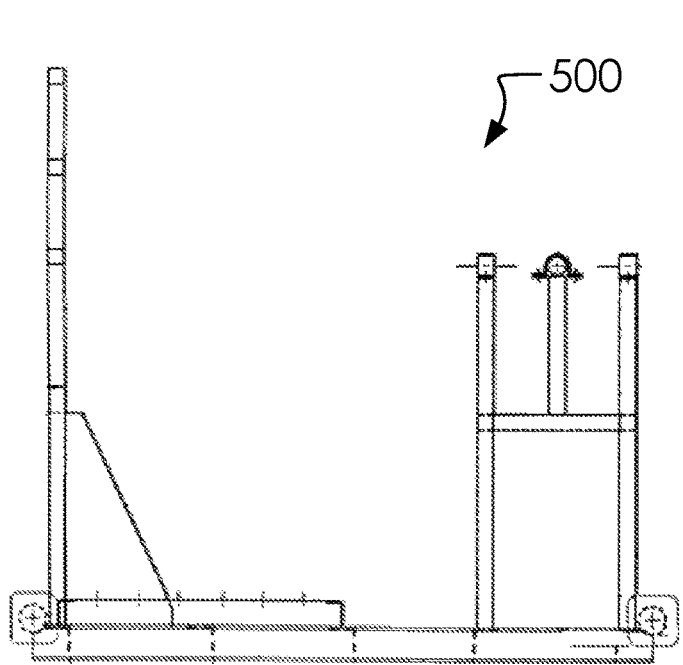
FIGS. 9A, 9B and 9C illustrate a perspective front view, side view and top view of a skid 500.
Figure 9B:
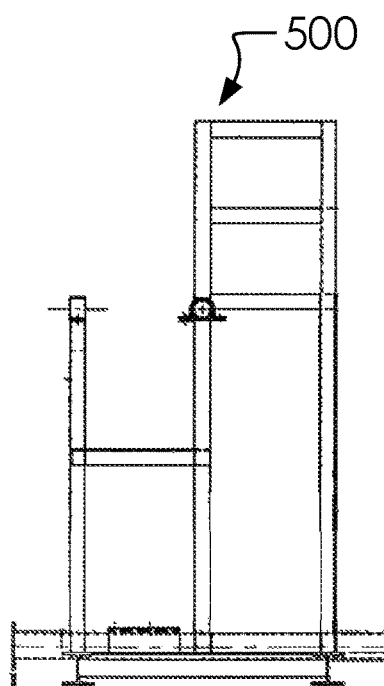
Figure 9C:
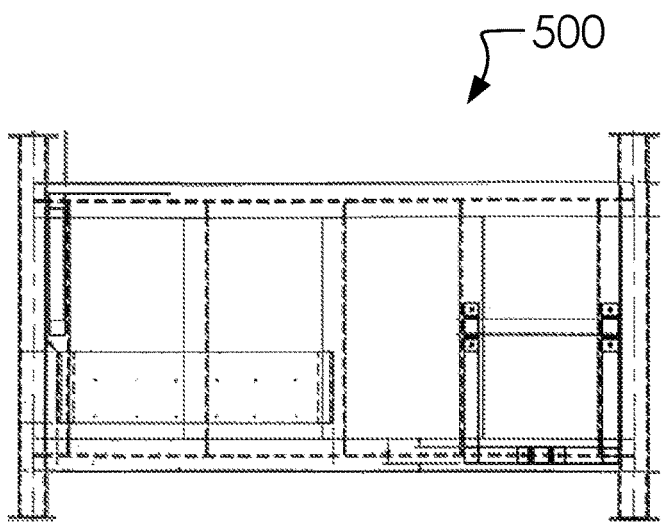

FIGS. 9A, 9B and 9C illustrate a perspective front view, side view and top view of a skid 500.

Figure 10:
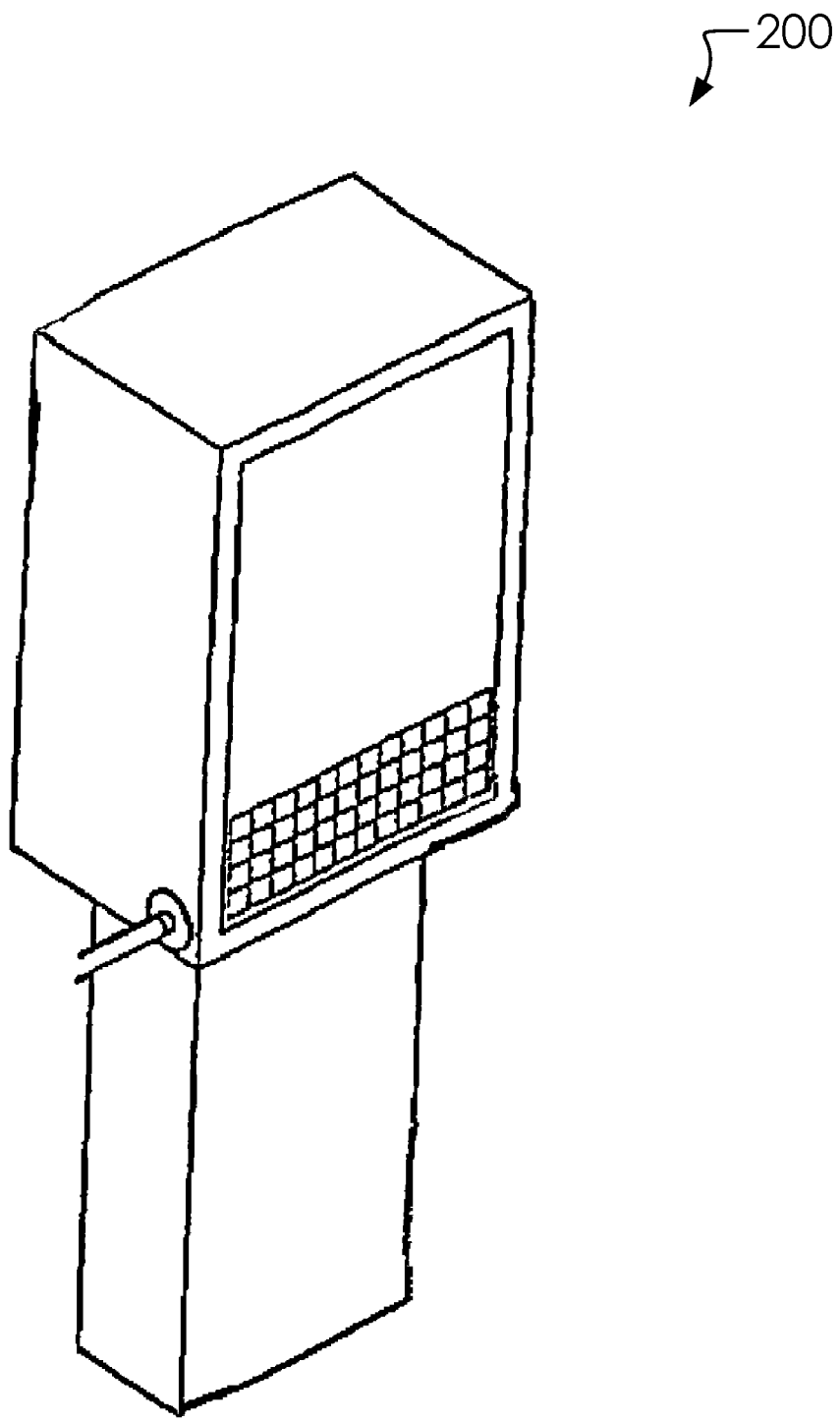
FIG. 10 illustrates a perspective overview of said bacteria monitor 200.

FIG. 10 illustrates a perspective overview of said bacteria monitor 200.

Figure 11:
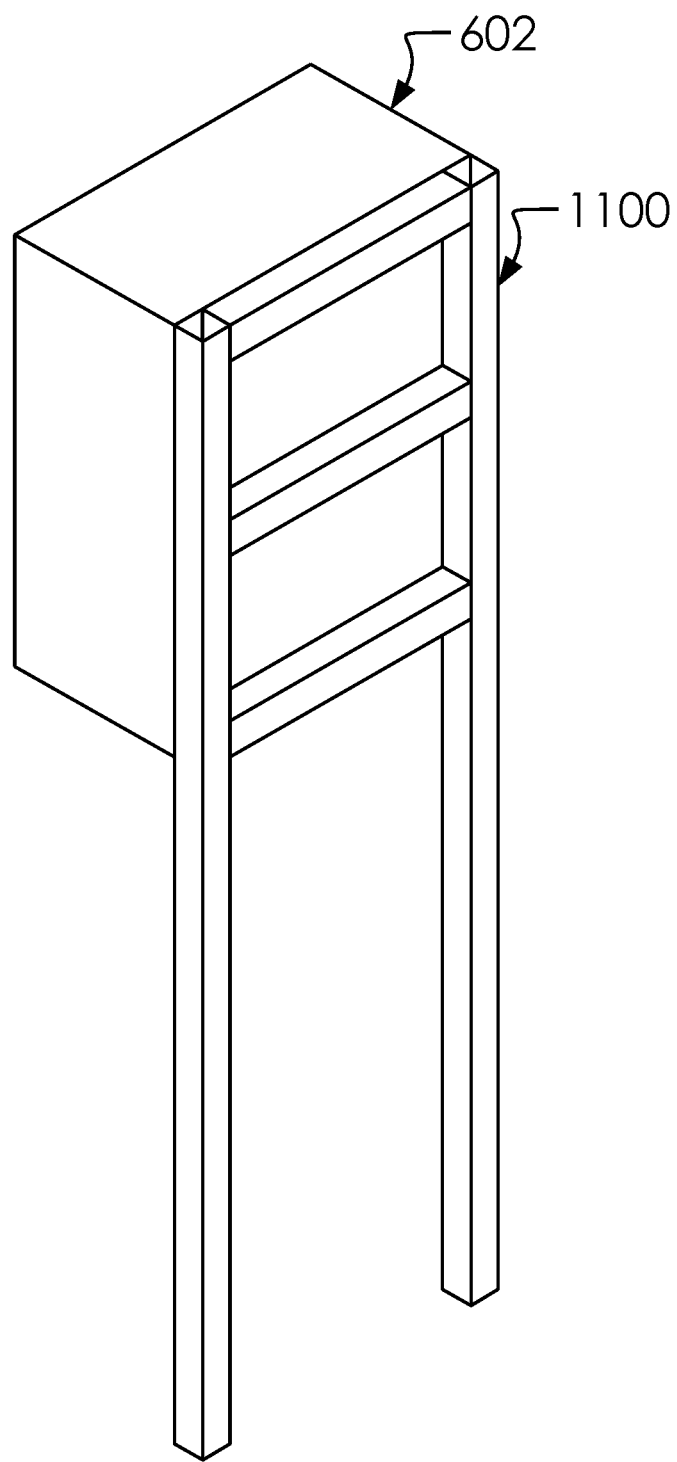
FIG. 11 illustrates a perspective backside view of a control box 602.

FIG. 11 illustrates a perspective backside view of a control box 602.

In one embodiment, said control box 602 can comprise said control box 602.

Figure 12:
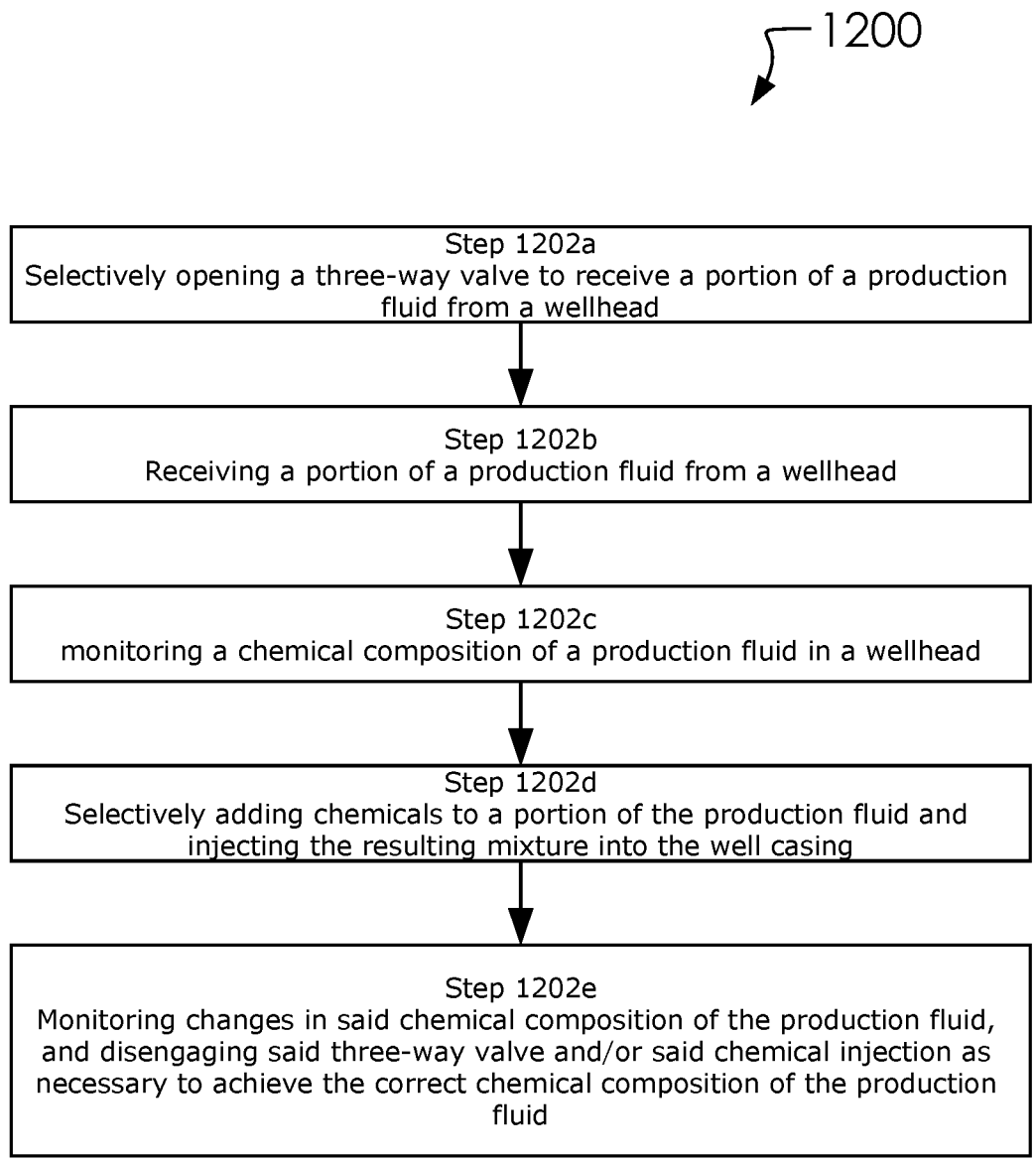
FIG. 12 illustrates an injection method of use 1200 of said injection system 100.

FIG. 12 illustrates an injection method of use 1200 of said injection system 100.

Said injection method of use 1200 can comprise one or more steps 1202 (which can comprise a first step 1202a, a second step 1202b, a third step 1202c, a fourth step 1202d and a fifth step 1202e).

Said first step 1202a can comprise selectively opening said actuated three-way valve 524 to receive a portion of said production fluid 114 from said wellhead 102; said second step 1202b can comprise receiving a portion of said production fluid 114 from said wellhead 102; said third step 1202c can comprise monitoring a chemical composition; said fourth step 1202d can comprise selectively adding a mixture of chemicals from said one or more chemical storage tanks 406 into said production fluid 114 and injecting the resulting mixture back into said wellhead 102; and said fifth step 1202e can comprise monitoring said production fluid 114 and modifying mixtures from said one or more chemical storage tanks 406 and/or closing said actuated three-way valve 524 according to a desired mixture.

Figure 13A:
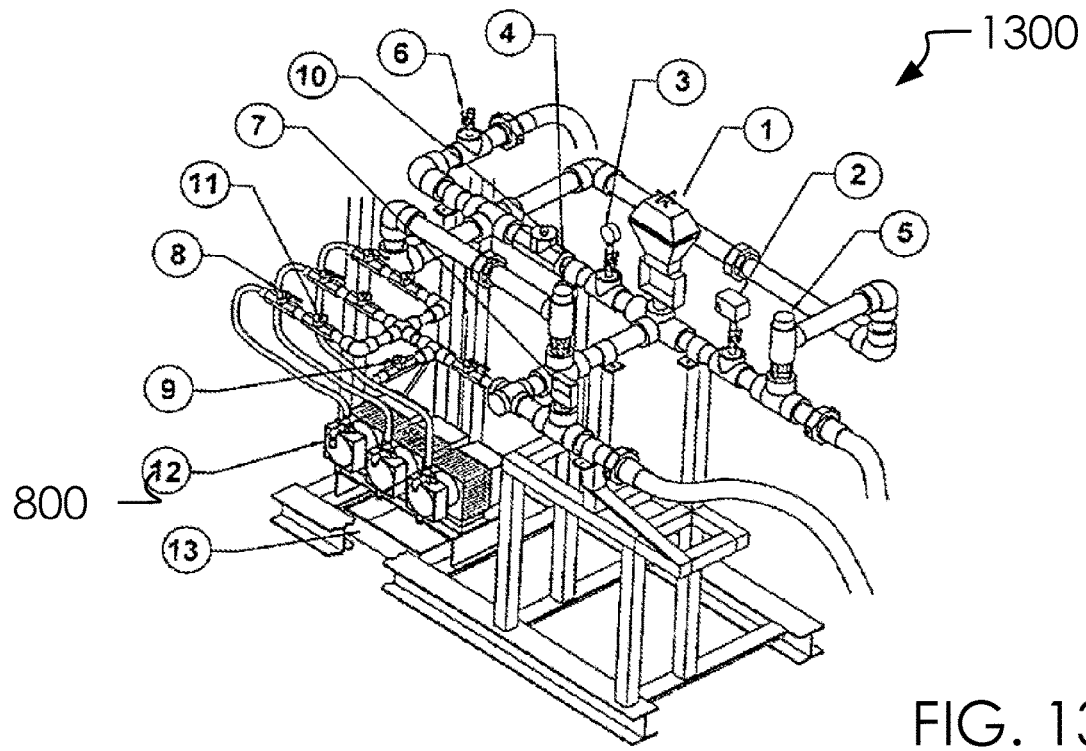
FIGS. 13A and 13B illustrate a perspective overview of said skid assembly 106 in an alternative view 1300 and a flow chart view 1302.
Figure 13B:
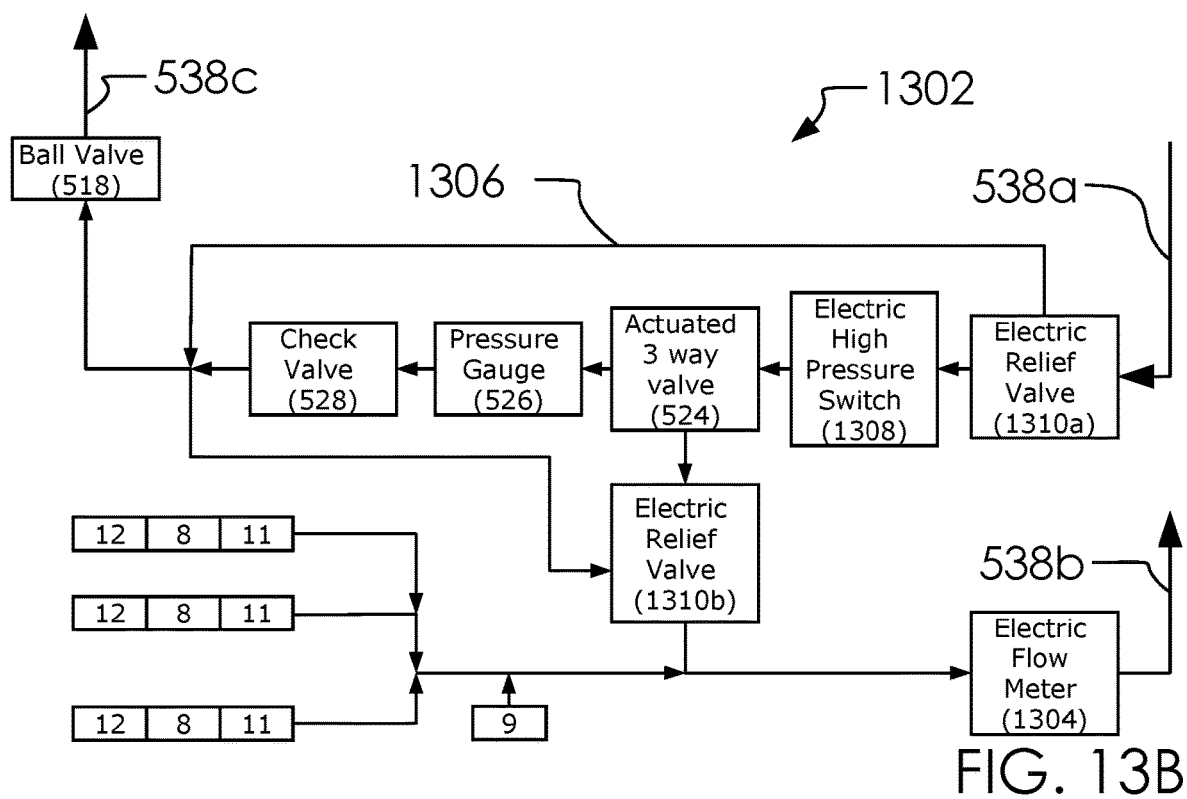

FIGS. 13A and 13B illustrate a perspective overview of said skid assembly 106 in an alternative view 1300 and a flow chart view 1302.

Advantages of said injection system 100 can include said skid 500 comprising a simple location for all valves, pumps, flow meters and relieves are mounted.

Said actuated three-way valve 524 can comprise an explosion proof actuator configured to turn the system on or off. With said actuated three-way valve 524 in an open condition, said injection system 100 can be engaged in a treatment cycle. Conversely, with said actuated three-way valve 524 closed, said injection system 100 and the treatment cycle can be complete. In one embodiment, said control panel 108 can be configured to engage said actuated three-way valve 524 when bacteria levels in said wellhead 102 reach a preconfigured condition.

Said one or more electrical pumps 800 can comprise one for each bacterial treatment known to be common at said wellhead 102.

A one or more electric chemical flow meters 1304 (which can comprise a first electric chemical flow meter 1304a and a second electric chemical flow meter 1304b) can be engaged to test the chemical line and one from the well flow line (from the casing) to measure the amount of chemical treatment and well production.

In one embodiment, a bypass line 1306 can be configured between said first electric chemical flow meter 1304a and said ball valve 518.

Said pressure gauge 526 can be used to measure pressure in piping within said skid 500. Said pressure switch 522 can be set on certain pressure and when pressure exceeds a threshold, to kill the chemical pumps and pumping unit. Said control panel 108 receives and issues an alarm condition.

In one embodiment, a one or more electrical relief valves 1310 (which can comprise a first electrical relief valves 1310a and a second electrical relief valves 1310b) can be used if there is a malfunction. Wherein, said one or more electrical relief valves 1310 open and sends liquid to the flow line down the stream of the skid (said third pressure hose 538c) to prevent damage to said wellhead 102. Also, so it doesn't make a mess, protecting the environment.

In one embodiment, an electric high-pressure switch 1308 can be configured to kill pumping if there is a failure in said one or more electrical pumps 800 or in case there is a malfunction in said one or more electrical relief valves 1310.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An injection system for treating a production fluid from a wellhead, wherein:
   said injection system comprises a skid assembly;
   said skid assembly comprises a first pressure hose, a second pressure hose and a third pressure hose;
   said first pressure hose is configured to receive an unconditioned portion of said production fluid from said wellhead;
   said second pressure hose is configured to return a conditioned portion said production fluid to said wellhead from said skid assembly;
   said skid assembly further comprises an actuated three-way valve configured to protect said injection system by selectively altering said injection system between an open condition and a closed condition to prevent explosions;
   with said actuated three-way valve in said open condition, said injection system is engaged in a treatment cycle;
   with said actuated three-way valve in said closed condition, said unconditioned portion of said production fluid from said wellhead can be sent into a production flow line through said third pressure hose.

2. Said injection system from claim 1, wherein:
   said injection system comprises a chemical tanks, a bacteria monitor, and a control panel;
   said control panel is configured to receive chemical analysis of said production fluid from said bacteria monitor and selectively adjust a one or more chemical additives being included in said conditioned portion of said production fluid to be returned into said wellhead;
   said injection system further comprises a one or more electrical pumps between said chemical tanks and said skid assembly; and
   said control panel is configured to selectively engage said one or more electrical pumps to pump said one or more chemical additives from said chemical tanks to said skid assembly.

3. Said injection system from claim 1, wherein:
   said skid assembly further comprises a one or more electric chemical flow meters, a bypass line, an electric high-pressure switch and a one or more electrical relief valves;
   said first pressure hose receives said unconditioned portion of said production fluid, which is in turn directed into a first electrical relief valves, said electric high-pressure switch, said actuated three-way valve, a pressure gauge, a check valve, and finally both a ball valve and a second electrical relief valves;
   with said first electrical relief valves in a closed condition, said unconditioned portion of said production fluid are directed into said bypass line and then into both said ball valve and said second electrical relief valves; and
   a control panel is configured to open said first electrical relief valves and said ball valve to ensure said unconditioned portion of said production fluid are directed into said production flow line in order to avoid over pressuring said injection system.

4. Said injection system from claim 3, wherein:
   said second electrical relief valves is configured to receive said production fluid from said actuated three-way valve and said check valve;
   said second electrical relief valves can then direct said production fluid into a stream with a one or more chemical additives from a one or more electrical pumps and a chemical tanks to create said conditioned portion of said production fluid; and
   said conditioned portion of said production fluid is then pumped back into said wellhead.

5. Said injection system from claim 3, wherein:
   said conditioned portion is measured with said first electrical relief valves before leaving said skid assembly through said second pressure hose for said wellhead.

6. An injection method of use for treating a production fluid from a wellhead, wherein:
   an injection system comprising a chemical tanks, a skid assembly, a bacteria monitor, and a control panel;
   an actuated three-way valve selectively opens and closes to allow a portion of said production fluid into said bacteria monitor; and
   said injection system adapted to
      selectively open said actuated three-way valve to receive a portion of said production fluid from said wellhead,
      receiving a portion of said production fluid from said wellhead,
      monitoring a chemical composition of said production fluid,
      selectively adding a mixture of chemicals from one or more chemical storage tanks into said production fluid,
      injecting the resulting mixture back into said wellhead, and
      monitoring said production fluid and modifying mixtures from said one or more chemical storage tanks and/or closing said actuated three-way valve according to a desired mixture.

* * * * *